June 4, 1968     MICHIJIRO AKABOSHI ET AL     3,386,981
METHOD OF MIXING A RELATIVELY VISCOUS LIQUID
WITH A RELATIVELY NON-VISCOUS LIQUID
Original Filed Feb. 5, 1959
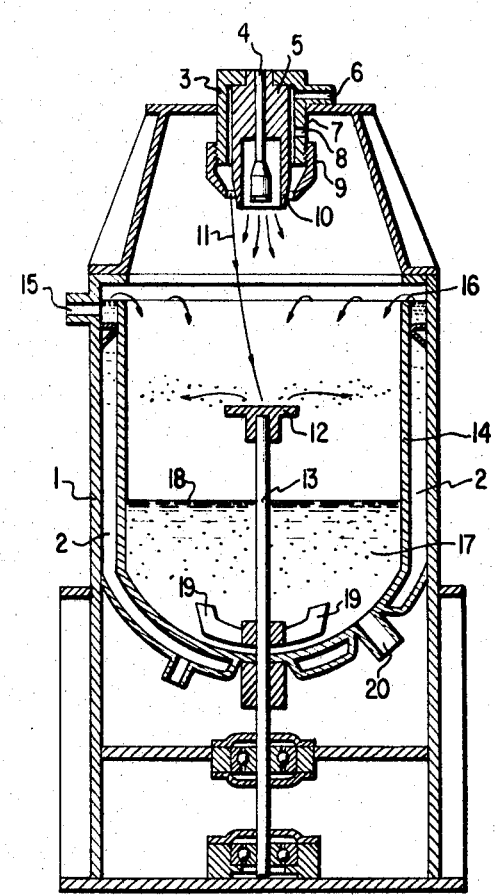
INVENTORS
MICHIJIRO AKABOSHI
TSUGUO KOMINAMI
SEIGO FUKUDA
KIKUJI URAGAMI
BY McLean, Norton & Boustead
ATTORNEYS

3,386,981
METHOD OF MIXING A RELATIVELY VISCOUS LIQUID WITH A RELATIVELY NON-VISCOUS LIQUID
Michijiro Akaboshi, Moto-machi, Toyonaka, Tsuguo Kominami, Nishinomiya, and Seigo Fukuda and Kikuji Uragami, Toyama, Japan, assignors to Kurashiki Rayon Co., Ltd., Kurashiki-shi, Japan, a corporation of Japan
Original application Feb. 5, 1959, Ser. No. 791,384, now Patent No. 3,186,803, dated June 1, 1965. Divided and this application Sept. 25, 1964, Ser. No. 411,955
Claims priority, application Japan, Feb. 11, 1958, 33/3,463, 33/3,464, 33/3,465
3 Claims. (Cl. 260—91.3)

This application is a division of application Ser. No. 791,384, filed Feb. 5, 1959, now U.S. Patent No. 3,186,-803, issued June 1, 1965.

The present invention pertains to a novel method for rapidly admixing a relatively viscous liquid with a relatively non-viscous liquid. The invention further relates to a method for rapidly admixing a viscous liquid with a relatively non-viscous liquid to form a mixture which reacts to form a solid product, and subsequently dispersing the mixture into small droplets and carrying out the reaction to produce a fine, uniform solid product. This invention is especially adapted for the production of polyvinyl alcohol by base catalyzed alcoholysis of a polymeric vinyl ester such as polyvinyl acetate.

It is known in the art to produce polyvinyl alcohol through the saponification of a polymeric vinyl ester, usually polyvinyl acetate. By saponification is meant in the present specification and claims the base catalyzed alcoholysis of polyvinyl ester to form polyvinyl alcohol. Usually a viscous alcohol solution of polyvinyl acetate is admixed with an aqueous or alcoholic solution of a strong base such as sodium hydroxide or sodium methylate. Saponification of the polyvinyl acetate rapidly takes place. During the saponification, the mixture changes from a viscous liquid to a sticky semi-solid to a hard solid product. Because of the nature of the reactants and reaction products, it has been extremely difficult to saponify polyvinyl alcohol in a continuous and economic manner. Prior techniques have involved mixing the reactants and conveying the reaction mixture from the mixing zone until the reaction was completed thereby producing solid polyvinyl alcohol. However, in order to further treat and purify the polyvinyl alcohol, it was necessary first to crush or shred the solid polyvinyl alcohol into small particles. Non-uniform particles were produced which after treatment gave a somewhat non-uniform product.

Other prior problems involved the tendency of the saponifying admixture to adhere to surfaces in the reaction chamber causing clogging and stoppage of moving parts and other difficulties.

It is an object of the present invention to provide a new and improved method for the production of polyvinyl alcohol.

It is an additional object of the invention to provide a novel method for rapidly and easily admixing a viscous liquid with a non-viscous liquid.

Still a further object of the invention is to provide a method for avoiding sticking of a reaction mixture to reaction vessel walls during a reaction.

Other objects will be apparent from the following description of the invention.

The attached drawing is illustrative of the methods of this invention.

Referring to the drawing, saponifier 1 is equipped with heating jacket 2 to provide temperature control of the reaction zone. Mixer 3 is located at the top of the saponifier. Inlet line 4 is provided in the mixer to convey the relatively non-viscous liquid, e.g., the aqueous or alcohol solution of basic catalyst to the mixing zone. Inlet line 6 is provided through which the viscous liquid passes on its way to the mixing zone. The viscous liquid passes through line 6 and through space 7 which is formed between solid tubes 5 and 8. Adjusting cap 9 is screwed to the lower end of tube 8. The viscous liquid passes between cap 9 and the lower end of tube 5 on its way to the mixing zone. The lower end of tube 5 is inclined as indicated in the attached drawing. Thus by screwing cap 9 up or down, the clearance between cap 9 and tube 5 and hence the thickness of the film of viscous liquid passing to the mixing zone can be easily controlled. Alternatively, means can be provided for moving tube 5 up and down in relation to cap 9 thereby controlling the thickness of the film of liquid passing between cap 9 and tube 5.

The clearance between cap 9 and tube 5 is adjusted to provide a very thin annular slit through which the viscous liquid passes. The viscous liquid passes through the thin slit and enters the mixing zone in the configuration of an annular thin continuous film. By adjusting the shape of the slit through which the viscous liquid passes, film shapes other than round can be obtained, e.g., plate-shaped. Generally round slits are preferred.

The continuous film of viscous liquid passes downwardly past the lower end of tube 5. Connected to the lower end of inlet line 4 and positioned within tube 5 is spray nozzle 10. The relatively non-viscous liquid passes through line 4 and is sprayed through nozzle 10 in the form of very fine droplets inside the thin continuous film of viscous liquid. In place of a spray nozzle, other means such as a rotary disc can be provided for spraying the non-viscous liquid inside the viscous liquid film. In this way, the relatively non-viscous liquid rapidly and uniformly contacts the film of viscous liquid and is admixed therewith.

Positioned below the spray nozzle 10 and tube 5 is rotary disc 12 rotated by shaft 13. The continuous film 11 of viscous liquid containing the sprayed relatively non-viscous liquid passes downwardly and impinges on the rotary disc as shown in the drawing. As indicated in the drawing, the liquid film while passing from the slit between cap 9 and tube 5 to the rotary disc 12 contracts in cross section due to the viscosity and surface tension of the film.

The film impinges on rotary disc 12 and is further admixed and is thrown by the rotary motion of disc 12 outwardly toward the walls 14 of the reaction vessel in the form of fine particles or droplets. It is preferred to provide projections on the peripheral edge of the rotary disc of radial cam plates on the disc to further improve the mixing of the liquid as a result of impinging on the rotary disc.

An additional liquid is introduced continuously into the reaction zone through inlet 15 and overflows dam 16. The liquid overflow passes downwardly in the form of a film along the walls 14 of the reactor. The fine particles or droplets of admixed liquids which are thrown centrifugally outward by disc 12 are carried downwardly by the liquid film along the reactor walls. In this way, adhesion of the admixed liquids or their reaction products to the walls of the reactor is prevented. The liquid film flows along the walls of the reactor downwardly into slurry 17 maintained at constant level 18. Agitator means 19 are provided to continuously agitate the slurry. Slurry product is taken from the reactor through outlet 20.

Practice of the invention is especially applicable to the continuous production of uniform, finely divided particles of polyvinyl alcohol through the saponification of polymeric vinyl ester such as polyvinyl acetate. The following is a description of a preferred embodiment of the invention relating the the said production of polyvinyl alcohol.

A solution of 20% by weight polyvinyl acetate in methanol having a viscosity of about 10 poises is introduced into mixer 3 through inlet line 6. Other suitable polyvinyl ester, e.g., polyvinyl formate, can be employed. Other lower alcohols including, for example, ethanol, propanol, and the like can also be employed. Wide ranges of concentration of the polymer in the alcohol are suitable.

An aqueous solution of sodium hydroxide is introduced into the mixer through inlet line 4. Suitably a solution comprising 23% by weight sodium hydroxide is employed although base catalyst solutions containing wide ranges of concentration of basic material can be employed. In place of sodium hydroxide, other basic materials known to catalyze the alcoholysis of polyvinyl acetate can be used. Examples of such additional materials include potassium hydroxide, sodium methylate, potassium methylate, and the like. Alcohol solutions of catalyst can be employed.

The alcohol polymer solution passes through space 7 and through the slit provided between cap 9 and tube 5. The clearance between cap 9 and the inclined end of tube 5 is very small in order to provide a very thin, continuous film of alcohol polymer solution. The aqueous caustic solution passes through line 4 and is sprayed in the form of fine droplets through spray nozzle 10. The catalyst spray thoroughly and uniformly contacts the polymer solution film and immediately initiates saponification thereof. Generally both the catalyst and polymer solutions are preheated to about 35–90° C. The relative amounts of polymer solution and catalyst solution can vary. Illustratively, about 0.15 mol of basic catalyst per mol of polymerized vinyl acetate can be used. Amounts greatly outside this range can be used as will be apparent to those skilled in the art.

The continuous polymer solution film passes downwardly and impinges upon rotary disc 12. Further mixing of the basic catalyst solution and alcoholic polymer solution which already is reacting takes place upon impinging upon the rotary disc. The saponifying mixture is formed into very small, uniform particles or droplets of catalyst and polymer solution as a result of impinging on the rotary disc. The reacting particles or droplets are thrown outwardly toward the reactor walls.

Simultaneously with the introduction of catalyst and polymer solution to the mixer, liquid is introduced into the saponifier through inlet 15. This liquid overflows dam 16 and flows in a film down the whole inner wall of the saponifier as indicated in the drawing. Conveniently, this liquid comprises the liquid reaction product mixture from the saponification, i.e. mainly methanol and methyl acetate. Other liquids including lower alcohols such as ethanol and methanol can be employed as well as various inert liquids, in which polyvinyl alcohol is not soluble.

The saponifying particles are carried to slurry 17 wherein saponification is completed. Total time for completion of the saponification is usually two minutes or less. Agitator 19 provides continuous agitation of the slurry. A product slurry stream is taken from outlet 20. Polyvinyl alcohol particles having uniform small particle size are recovered from the slurry by known techniques, e.g. filtration. The polyvinyl alcohol particles can be further treated in accordance with known procedures. The separated slurry liquid can be recycled to the saponification zone. The saponification zone is preferably heated by a hot water jacket at 50–90° C. to accelerate the saponification.

Practice of the above described embodiment of the invention has many advantages. The catalyst and polymer solution inlet lines are separately located, and initial admixture of these materials occurs in space. During shutdowns plugging of inlet lines is avoided since these lines or the areas adjacent them do not contain the catalyst and polymer mixed.

Plugging and coating of reactor walls with solid reaction material is avoided through the provision of the liquid film flowing down the reactor inner walls. Thus costly equipment plugging and stoppage is avoided.

The polyvinyl alcohol is produced in the form of fine discrete particles of good uniformity which can be readily and uniformly further treated. The rapid and complete mixing achieved through practice of the invention results in rapid, uniform, and more complete saponification of the polyvinyl acetate.

While the above preferred embodiment of the invention relates to the production of polyvinyl alcohol, it will be apparent that the invention has broad applicability to many different systems.

We claim:

1. The method of mixing a relatively viscous alcohol solution of polyvinyl acetate with a relatively non-viscous solution of aqueous sodium hydroxide which comprises forming an alcohol solution of polyvinyl acetate into a continuously downwardly flowing cylindrical film, forming the aqueous sodium hydroxide solution into a fine spray interiorly of said continuously flowing cylindrical film, and contacting the inner surfaces of said continuously flowing film with said fine spray of said aqueous sodium hydroxide solution.

2. The method of producing polyvinyl alcohol which comprises forming an alcoholic polyvinyl ester solution into a continuously flowing cylindrical film forming a solution of a basic catalyst effective to catalyze saponification of said polyvinyl ester into a fine spray, contacting the inner surfaces of said cylindrical film with said fine spray thereby to initiate saponification of the polyvinyl ester solution, forming the saponifying film into fine, discrete droplets, and subsequently recovering fine, uniform particles of polyvinyl alcohol.

3. The method of claim 2 wherein adhesion of the said fine discrete droplets to container walls is prevented by forming a flowing film of liquid saponification products on container walls contacted by said droplets.

References Cited

UNITED STATES PATENTS

| | | | |
|---|---|---|---|
| 2,085,524 | 6/1937 | De Simo et al. | 260—2 |
| 2,832,572 | 4/1958 | Meng | 259—1 |
| 2,967,048 | 1/1961 | Fontaine | 259—1 |
| 2,478,431 | 8/1949 | Stamatoff | 260—91.3 |
| 2,779,752 | 1/1957 | Vining | 260—91.3 |

JOSEPH L. SCHOFER, *Primary Examiner.*

H. WONG, J. F. McNALLY, *Assistant Examiners.*